United States Patent
Bachmann

(10) Patent No.: US 9,416,813 B2
(45) Date of Patent: Aug. 16, 2016

(54) AIRCRAFT BOARDING BRIDGE OR STAIRS

(71) Applicant: Hübner GmbH & Co. KG, Kassel (DE)

(72) Inventor: Jens Bachmann, Homberg (DE)

(73) Assignee: Hübner GmbH & Co. KG, Kassel (DE)

( * ) Notice: Subject to any disclaimer, the term of this patent is extended or adjusted under 35 U.S.C. 154(b) by 0 days.

(21) Appl. No.: 14/493,955

(22) Filed: Sep. 23, 2014

(65) Prior Publication Data

US 2015/0082586 A1    Mar. 26, 2015

(30) Foreign Application Priority Data

Sep. 24, 2013    (EP) .................................... 13004629

(51) Int. Cl.
| | | |
|---|---|---|
| *E01D 1/00* | (2006.01) | |
| *F16B 45/00* | (2006.01) | |
| *B64F 1/305* | (2006.01) | |
| *B64F 1/31* | (2006.01) | |
| *B64F 1/315* | (2006.01) | |
| *B64F 1/30* | (2006.01) | |

(52) U.S. Cl.
CPC . *F16B 45/00* (2013.01); *B64F 1/30* (2013.01); *B64F 1/305* (2013.01); *B64F 1/3055* (2013.01); *B64F 1/31* (2013.01); *B64F 1/315* (2013.01); *Y10T 24/44043* (2015.01); *Y10T 24/4523* (2015.01)

(58) Field of Classification Search
CPC .......... B64F 1/305; B64F 1/3055; B64F 1/31; B64F 1/315; Y10T 24/44043
USPC ........... 14/71.5, 71.1, 74, 78; 52/63, 222, 273
See application file for complete search history.

(56) References Cited

U.S. PATENT DOCUMENTS

| | | | | |
|---|---|---|---|---|
| 3,703,737 A | | 11/1972 | Eggert, Jr. | |
| 3,845,591 A | * | 11/1974 | Stine ................... | E04B 1/34305 135/129 |
| 4,333,195 A | * | 6/1982 | Lichti ..................... | B64F 1/305 138/118 |
| 5,010,614 A | * | 4/1991 | Braemert ............... | B61D 17/20 104/20 |
| 5,267,368 A | * | 12/1993 | Saunders ............... | B64F 1/305 135/132 |
| 5,481,773 A | * | 1/1996 | Alten .................. | B65G 69/2829 14/69.5 |
| 6,292,968 B1 | * | 9/2001 | McLain .................. | E01D 15/24 104/31 |
| 6,314,684 B1 | * | 11/2001 | Aviram ................. | E04H 15/646 160/392 |
| 7,690,065 B2 | * | 4/2010 | Muller .................... | B64F 1/305 14/71.5 |
| 7,712,268 B1 | * | 5/2010 | Guthrie ................... | E06B 5/003 52/202 |
| 7,814,727 B2 | * | 10/2010 | LaCasse ............... | E04B 1/0046 52/222 |
| 8,429,780 B2 | * | 4/2013 | Scharf .................. | B64F 1/3055 14/71.5 |
| 2002/0116771 A1 | | 8/2002 | Coles et al. | |
| 2003/0163966 A1 | * | 9/2003 | Reynolds .............. | E04B 1/3211 52/461 |
| 2005/0251933 A1 | * | 11/2005 | Mitchell ............ | B65G 69/2894 14/71.1 |
| 2006/0130412 A1 | * | 6/2006 | Von Arx .................. | E04B 9/303 52/222 |

FOREIGN PATENT DOCUMENTS

FR    2407089 A1    5/1979

* cited by examiner

*Primary Examiner* — Adriana Figueroa

(74) *Attorney, Agent, or Firm* — Dinsmore & Shohl LLP; Douglas L. Wathen

(57) ABSTRACT

An aircraft boarding bridge or stairs with a bellows attached to a head frame of the aircraft boarding bridge or stairs by a fastening device. The fastening device has a positive connection acting at least in to spatial directions, wherein the positive connection is fixable by an at least non-positive connection member.

13 Claims, 2 Drawing Sheets

AIRCRAFT BOARDING BRIDGE OR STAIRS

CROSS-REFERENCE TO RELATED APPLICATION

This application claims priority of European Patent Application No. EP 13 004 629.5, filed Sep. 24, 2013, the content of which is incorporated herein in its entirety.

FIELD OF THE INVENTION

The invention relates to an aircraft boarding bridge or aircraft boarding stairs with a bellows attached to a head frame of the aircraft boarding bridge or stairs by way of a fastening device.

BACKGROUND OF THE INVENTION

Aircraft boarding stairs or aircraft boarding bridges are sufficiently known from the prior art. Aircraft boarding stairs and aircraft boarding bridges both have, at their front end facing the aircraft, a bellows, which is configured in such a manner that it covers the gap between the head side end of the aircraft boarding bridge or stairs and the outer hull of the aircraft in the area of the aircraft entrance.

The aircraft boarding bridge or stairs features a so-called head frame on its front side end. The folding bellows has a bellows frame at its end facing the aircraft boarding bridge or stairs, the head frame being connected to the bellows frame. This is usually done by attaching the bellows frame with the bellows to the head frame, e.g. by way of a screw clamp, driving corresponding bores through the head frame and bellows frame and subsequently connecting the bellows frame of the bellows with the head frame by means of rivets. This is very complicated, more specifically since the entire bellows is already hinged to the bellows frame. This means that the bellows is always behind a workman when drilling the holes and inserting the rivets.

SUMMARY OF THE INVENTION

Therefore, the problem underlying the invention is to solve this issue. More specifically, the problem is to provide a connection between the bellows and the aircraft boarding bridge or aircraft boarding stairs that is easily producible at low cost.

In order to solve the problem, the invention proposes that the fastening device should comprise means for providing a positive connection acting in at least two spatial directions, wherein the positive connection is fixable by way of an at least non-positive connecting member. A combination of a non-positive connection with a means for providing a positive connection makes it possible not only to provide a simple and cost-effective fastening device but also one that is quickly mountable and detachable without a destruction of the individual connection elements. In this regard, using such a fastening device has other advantages; these are more specifically that in order to transport an aircraft boarding bridge or stairs, the bellows and the aircraft boarding bridge or aircraft boarding stairs can be transported separately. This considerably facilitates the transport, since a fastening of the bellows to the aircraft boarding bridge or stairs can occur on site by way of the fastening device according to the invention. In addition, if a replacement part is needed, a replacement of the bellows is possible without difficulty. This means that the connection is detachable.

In detail, it is provided that the means comprise first and second connection elements that may be brought into a positive engagement with each other, wherein the first connection element is more specifically configured as a profile with an approximately C-shaped cross-section and the other second connection element is configured as a hook member. A hook member is a member that is able to at least partially engage behind the C-shaped connecting member along the better part of its length, or at least behind a part of the C-shaped profile serving as a connecting member. The hook member, configured in this regard as a strip, more specifically engages with the C-shaped profile with a clearance. A strip made of an elastomer, which presses the hook member onto the C-shaped profile, is provided as a non-positive connecting element for fixing the hook member to the C-shaped profile. This means that the hook member engaging with a clearance with the C-shaped profile is held in place by the elastic strip. In this regard, the strip, which is configured more specifically as a keder profile, can be characterized by a tapered end, in order to be able to drive this keder profile into the space between the hook member on the one hand and the C-shaped profile on the other hand.

In order to prevent the strip made of an elastomer from unintentionally disengaging itself from its fixing position, it is provided that the strip has a groove at least on one longitudinal side, which serves for a partial positive engagement around or behind the hook member and/or a protrusion of the C-shaped profile. In this regard, if the strip has at least one groove running along the strip, which is engaged either with the hook member or with the protrusion of the C-shaped profile, the strip made of an elastomer is no longer only an element that is able to provide a non-positive connection but the connection between the strip and the hook member and the C-shaped profile is also characterized by a positive-fit component. Such a strip is also referred to as a keder profile. The strip is made of an elastomer and which holds the hook member in an engagement with the C-shaped profile by means of a positive connection but also, if applicable, by means of a non-positive component.

Alternately to the previously described embodiment, an embodiment is also conceivable in which a C-shaped profile is also provided as a first connection element, wherein the C-shaped profile receives a strip-like hook member made of an elastomer. Here, the strip-like hook member has two grooves, with which the protrusions of the C-shaped profile, which respectively point toward each other, engage. In order to be able to drive the hook member made of an elastomer into the C-shaped profile, the hook member has a recess, which serves to receive the keder strip, in the area of the two protrusions of the C-shaped profile pointing toward each other. This means that the hook strip, which also consists of an elastomer, is held in position by the keder strip consisting of an elastomer.

Another embodiment is characterized in that the C-shaped profile has in particular two legs, which are connected to each other by a web, wherein the hook member is grasped by the legs. The C-shaped profile has a leg shaped as a shoe at one of its ends, wherein the hook member has a foot in the area of the shoe, which is mounted in the leg configured as a shoe. The leg has a protrusion, which extends approximately parallel to the foot of the hook member. Between the foot of the hook member and the protrusion, there is a gap, which serves to receive the strip made of an elastomer. In order to prevent the strip made of an elastomer from getting out of the shoe, the hook member has a projection in the area of the foot.

In addition, it is more specifically provided that the first connection element, more specifically the C-shaped profile, is fixed, e.g. screwed, to the head frame of the aircraft boarding bridge or aircraft boarding stairs. In order to prevent humidity from entering between the first connection element on the one hand and the head frame on the other hand into the inside of the aircraft boarding bridge or stairs, the first connection element is advantageously sealed against the head frame, for example by means of silicone.

Any number of connection types, e.g. clamping, gluing, screwing, etc. are known for connecting the hook member to the bellows.

In order to save weight, the C-shaped profile is advantageously made of aluminium. In different variants, this also applies to the hook member.

In the following, the invention is exemplarily described in more detail based on the drawings.

DETAILED DESCRIPTION OF THE INVENTION

Figure 1:
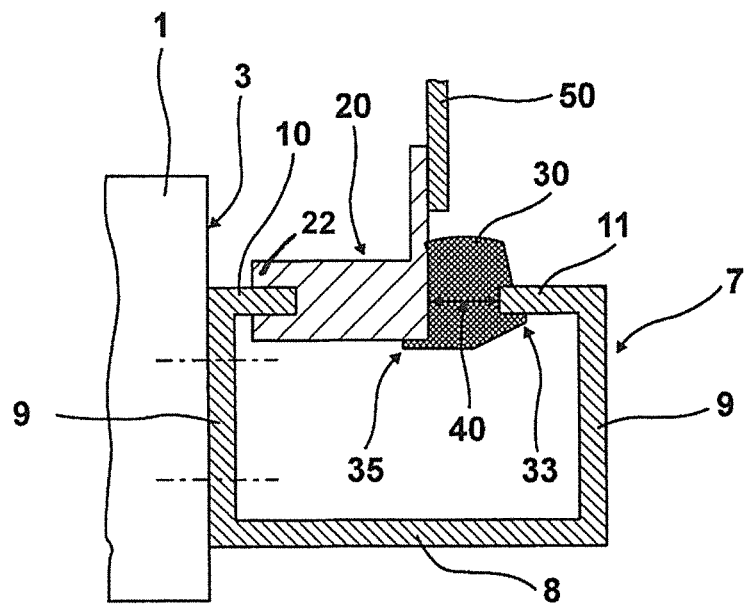
FIG. 1 shows a first embodiment of a fastening device in accordance with the present invention.

The aircraft boarding bridge or stairs is schematically hinted at and labelled 1. The aircraft boarding bridge or stairs 1 has a head frame 3, which is disposed at the front of the aircraft boarding bridge or stairs 1 in a U-shaped circumferential manner. The C-shaped profile 7, 70, which is more specifically screwed to the head frame 3, is also disposed in a U-shaped circumferential manner on the head frame 3. A sealing compound, for example made of silicone, is located between the C-shaped profile 7, 70 and the head frame 3, in order to prevent humidity from getting into the inside of the aircraft boarding bridge or stairs.

The C-shaped profile 7, 70 has a web 8; 80, which serves to implement a screw connection with the head frame 3. The web 8; 80 features two legs 9; 90, 91 disposed at both ends in a U-shaped manner, wherein the two legs have first and second protrusions 10, 11; 100, 111 pointing toward each other. This results in a profile with a C-shaped cross-section.

In order to be received by the C-shaped profile 7, the hook member labelled 20 in FIG. 1 has a U-shaped claw 22, wherein the claw 22 serves to hook the strip-shaped hook member 20 into the first protrusion 10 of the C-shaped profile 7. The strip 30 made of an elastomer, which may also be referred to as a keder, is provided in order to fix this hook member 20 with the claw 22 in the position shown in the figure. At one side of its longitudinal edge, the keder or strip 30 has a groove 33, which captures the second protrusion 11 of the C-shaped profile 7. The nose 35, which engages behind the hook member 20, is provided in order to reliably prevent the strip 30 from unintentionally slipping out.

Here, it can be seen that the hook member 20 is positively received by the C-shaped profile 7 in two spatial directions X and Y. The hook member 20 first rests with a clearance in the C-shaped profile 7, wherein the clearance is defined by a free space 40 between the hook member 20 and the free end of the second protrusion 11. The strip 30 is driven into this free space 40, so that the hook member 20 is ultimately held in the position shown in FIG. 1.

Figure 2:
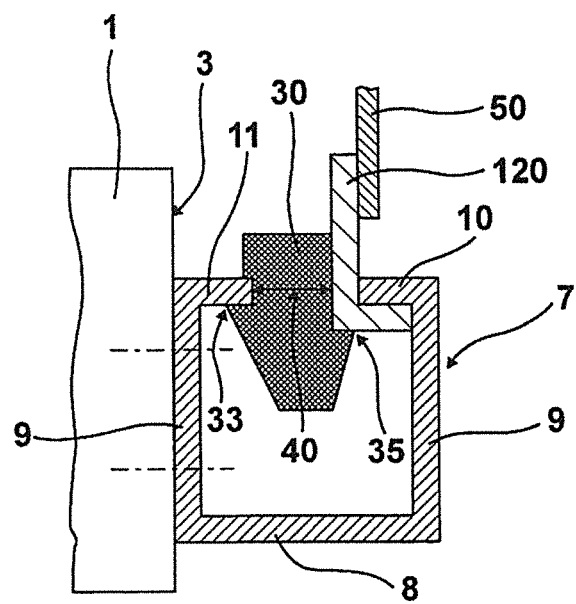
FIG. 2 shows a second embodiment of a fastening device in accordance with the present invention.

The embodiment according to FIG. 2 differs from that in FIG. 1 in that the strip-shaped hook member 120 is merely L-shaped and does not have a U-shaped claw like the hook member 20. In the embodiment according to FIG. 2, the hook member 120 is also held in position by the strip 30. The strip 30 here also features a groove 33 to be received by the second protrusion 11 of the C-shaped profile 7.

Figure 3:
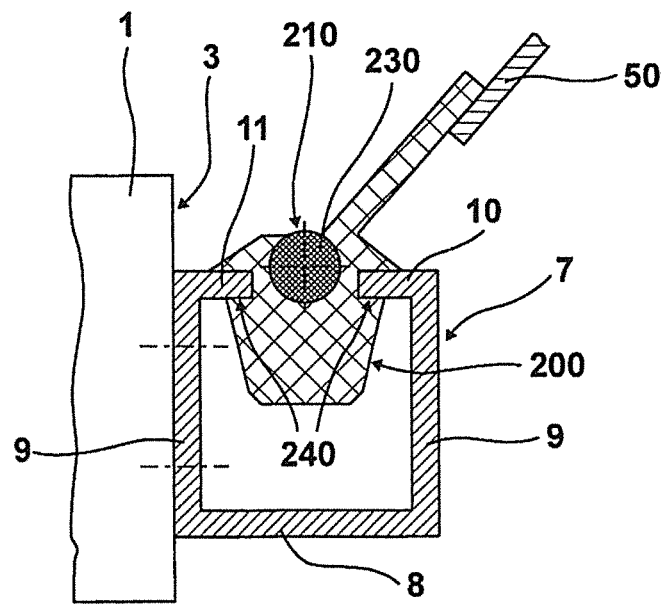
FIG. 3 shows a third embodiment of a fastening device, wherein the hook member is made of an elastomer in accordance with the present invention.

The embodiment according to FIG. 3 features a C-shaped profile 7, which is configured in the same manner as in FIG. 2. Here however, the C-shaped profile 7 receives a strip-shaped hook member 200, wherein the hook member 200 is made of an elastomer. In order to receive the two protrusions 10 and 11 of the C-shaped profile 7 pointing toward each other, the hook member 200 has two grooves 240, in which the protrusions 10 and 11 of the C-shaped profile engage, as can be gathered from FIG. 3. In the area of the two grooves 240, there is a recess 210, which serves to receive the strip 230 made of an elastomer material. This means that, in principle, the strip 230 forms a keder strip.

Figure 4:
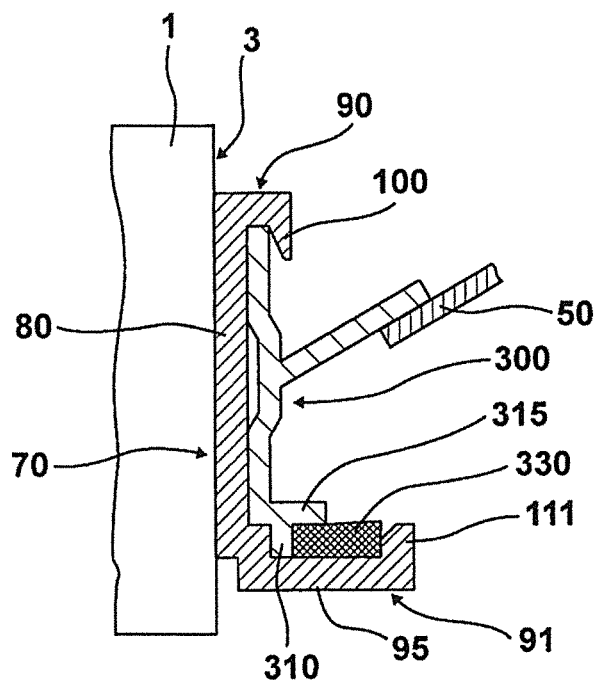
FIG. 4 shows a fourth embodiment of a fastening device in accordance with the present invention.

In the embodiment according to FIG. 4, the C-shaped profile 70 features two legs 90, 91 connected by the web 80, which, at their ends, respectively have protrusions 100, 111 pointing toward each other. The leg 91 is here configured in the manner of a shoe 95. In the area of the shoe 95, the strip-like hook member labelled 300 has a foot 310, which is spaced apart from the protrusion 111 of the shoe 95. The strip 330 made of an elastomer is introduced into the space formed by the gap, wherein, in order to prevent the strip 330 from getting out the shoe 95 under a load, the hook member 300 has a projection 315 in the area of the foot 310.

The hook member 20, 120, 200, 300 additionally features the bellows 50 at one free end.

LIST OF REFERENCE NUMBERS 1 aircraft boarding bridge or stairs
3 head frame
7 C-shaped profile
8 web
9 leg
10 first protrusion
11 second protrusion
20 hook member
22 claw
30 strip (made of an elastomer)
33 groove
35 nose
40 free space between the second protrusion and the hook member
50 bellows
70 C-shaped profile
80 web
90 leg
91 leg
95 shoe
100 first protrusion
111 second protrusion
120 hook member
200 hook member (made of an elastomer)
210 recess in the hook member
230 strip (made of an elastomer)
240 grooves
300 hook member
310 foot
315 projection
330 strip (made of an elastomer)

The invention claimed is:

1. A fastening assembly for fastening a bellows of an aircraft boarding bridge or stairs to a head frame of the bridge or stairs, the fastening assembly comprising:
   a fastening device having a positive connection portion operable to exert a force in at least two spatial directions,
   wherein the positive connection portion includes first and second connection elements that are operable to be brought into positive engagement with each other,
   wherein the first connection element is a profile with an approximately C-shaped cross section having a first protrusion and a second protrusion,
   and wherein the second connection element engages the first protrusion with a clearance, the clearance being defined by a free space between the second connection element and a free end of the second protrusion; and
   a non-positive connection member operable to be disposed in the clearance to fix the positive connection portion of the fastening device.

2. A fastening assembly in accordance with claim 1, wherein the second connection element is a hook member.

3. A fastening assembly in accordance with claim 1, wherein the non-positive connection member is an elastomer strip operable to press the second connection element onto the C-shaped profile.

4. A fastening assembly in accordance with claim 3, wherein the elastomer strip has at least one longitudinal side with a groove defined therein.

5. A fastening assembly in accordance with claim 2, wherein the hook member is made of an elastomer.

6. A fastening assembly in accordance with claim 1, wherein:
   the C-shaped profile has two legs which are connected to each other by a web;
   one of the legs is configured as a shoe, the shoe including one of the protrusions;
   the second connection element is a hook member and the hook member has a foot to be received by the shoe; and
   the non-positive connection member is an elastomer strip, being inserted between the foot and the protrusion of the shoe.

7. A fastening assembly in accordance with claim 6, wherein:
   the hook member has a projection in the area of the foot for fixing the strip.

8. A fastening assembly in accordance with claim 3, wherein the strip is configured as a keder profile.

9. A fastening assembly in accordance with claim 1, wherein the first connection element is fixed to a head frame of an aircraft boarding bridge or stairs.

10. A fastening assembly in accordance with claim 1, wherein the first connection member is sealed against the head frame.

11. A fastening assembly in accordance with claim 1, wherein the non-positive connection member has a groove that receives the second protrusion.

12. A fastening assembly in accordance with claim 1, wherein the non-positive connection member has a nose which engages with the second connection element.

13. A fastening assembly in accordance with claim 2, wherein the hook member has a U-shaped claw, the U-shaped claw engaging the first protrusion.

* * * * *